United States Patent
Stottan et al.

(10) Patent No.: US 11,584,424 B2
(45) Date of Patent: Feb. 21, 2023

(54) OPERATOR CONTROL UNIT FOR A STEERING WHEEL, AND STEERING WHEEL HAVING THE SAME

(71) Applicant: Audio Mobil Elektronik GmbH, Braunau am Inn—Ranshofen (AT)

(72) Inventors: Thomas Stottan, Braunau am Inn (AT); Richard Frei, Braunau am Inn (AT); Thomas Hatheier, St. Peter am Hart (AT); Gerhard Landgraf, Braunau am Inn (AT)

(73) Assignee: Audio Mobil Elektronik GmbH, Braunau am Inn—Ranshofen (AT)

( * ) Notice: Subject to any disclaimer, the term of this patent is extended or adjusted under 35 U.S.C. 154(b) by 0 days.

(21) Appl. No.: 17/265,770

(22) PCT Filed: Jul. 26, 2019

(86) PCT No.: PCT/EP2019/070279
§ 371 (c)(1),
(2) Date: Feb. 3, 2021

(87) PCT Pub. No.: WO2020/025506
PCT Pub. Date: Feb. 6, 2020

(65) Prior Publication Data
US 2021/0163056 A1 Jun. 3, 2021

(30) Foreign Application Priority Data
Aug. 3, 2018 (EP) ..................................... 18187380

(51) Int. Cl.
*B62D 1/06* (2006.01)
*B60H 1/00* (2006.01)
*B62D 1/04* (2006.01)

(52) U.S. Cl.
CPC ......... *B62D 1/065* (2013.01); *B60H 1/00292* (2013.01); *B62D 1/046* (2013.01)

(58) Field of Classification Search
CPC .......... B62D 1/04; B62D 1/046; B62D 1/065; B62D 1/08; B60H 1/00292
See application file for complete search history.

(56) References Cited

U.S. PATENT DOCUMENTS 6,298,750 B1 * 10/2001 Kerner ............... B60H 1/00292
454/152
6,862,807 B2 * 3/2005 Wissel .................. B21D 17/04
29/894.1

(Continued)

FOREIGN PATENT DOCUMENTS

DE 29817868 U1 12/1998
DE 19953467 A1 * 5/2001 ......... B60H 1/00292

(Continued)

*Primary Examiner* — Adam D Rogers

(57) ABSTRACT

An operator control unit for a steering wheel and a steering wheel having such an operator control unit. The operating control unit having a housing which is insertable into a steering wheel spoke of the steering wheel and which has at least one housing side wall and a housing base, having an electrical contact element provided in the housing, and having at least one actuating element which is mounted movably on the housing and which acts with an electrical switching action on the contact element. In order to extend the functionality of the operator control unit but maintain the compact structural form, it is proposed that the operator control unit have a fan for a steering wheel temperature control arrangement and a flow channel which is acted on by the fan, which flow channel is formed by the housing base and has an inlet and outlet opening on the housing.

13 Claims, 2 Drawing Sheets

(56) References Cited

U.S. PATENT DOCUMENTS

| | | | |
|---|---|---|---|
| 7,053,322 B2* | 5/2006 | Helmstetter | B60Q 1/0082 |
| | | | 200/61.54 |
| 8,067,709 B2* | 11/2011 | Han | G06F 3/016 |
| | | | 200/336 |
| 8,993,929 B2* | 3/2015 | Maranville | B62D 1/065 |
| | | | 219/204 |
| 9,308,930 B2* | 4/2016 | Bostick | B62D 1/08 |
| 9,399,480 B2* | 7/2016 | Zhang | B60H 1/00292 |
| 10,059,204 B2* | 8/2018 | Intini | G06F 3/0362 |
| 2004/0168540 A1* | 9/2004 | Weiss | B62D 1/065 |
| | | | 74/552 |
| 2009/0114368 A1* | 5/2009 | Niwa | B62D 1/065 |
| | | | 165/42 |
| 2015/0158370 A1* | 6/2015 | Glaser | B62D 1/04 |
| | | | 454/69 |
| 2015/0329137 A1* | 11/2015 | Onica | B62D 1/065 |
| | | | 165/59 |
| 2017/0217284 A1 | 8/2017 | Ji et al. | |

FOREIGN PATENT DOCUMENTS

| | | | | |
|---|---|---|---|---|
| DE | 102015219486 B3 | 10/2016 | | |
| DE | 102017107762 A1 * | 10/2018 | | B62D 1/04 |
| EP | 1213068 A2 | 6/2002 | | |
| EP | 2537173 B1 | 11/2016 | | |
| JP | 2006176037 A * | 7/2006 | | B62D 1/065 |
| KR | 20040090275 A * | 10/2004 | | |
| WO | WO-0128842 A1 * | 4/2001 | | B62D 1/065 |
| WO | WO-2015152470 A1 * | 10/2015 | | B62D 1/065 |

* cited by examiner

OPERATOR CONTROL UNIT FOR A STEERING WHEEL, AND STEERING WHEEL HAVING THE SAME

FIELD OF THE INVENTION

The invention relates to a steering wheel and an operator control unit for this steering wheel, having a housing which is insertable into a steering wheel spoke of the steering wheel and which has at least one housing side wall and a housing base, having an electrical contact element provided in the housing, and having at least one actuating element which is mounted movably on the housing and which acts with an electrical switching action on the contact element.

DESCRIPTION OF THE PRIOR ART

Operator control units provided in openings of a steering wheel spoke of a steering wheel are known from the prior art (EP2537173B1). Such devices have a housing which is insertable into the steering wheel spoke and which has a housing side wall and a housing base, which housing usually has a plurality of electrical switches, for example also including rocker switches, for actuating equipment in a motor vehicle. To accomplish this, the switches have a contact element provided in the housing and an actuating element which is mounted movably on the housing, which actuating element acts with an electrical switching action on the contact element. Due to relatively cramped space conditions, such operator control units must conform to compact structural conditions.

It is also known from the prior art to provide temperature control in motor vehicle steering wheels (DE29817868U1)—specifically with the aid of fans installed in steering wheel spokes. But this is relatively complicated and also requires a special shell construction of the steering wheel.

A steering wheel cooling arrangement is also known from US2017/0217284A1.

Based on the prior art explained at the beginning, the object of the invention, therefore, is to enhance the functionality of an operator control unit for a steering wheel, but without abandoning compact structural conditions in the process.

SUMMARY OF THE INVENTION

If the operator control unit has a fan and a flow channel which is acted on by the fan, then the operator control unit can contribute to the steering wheel temperature control and can thus be enhanced in its functionality. If the flow channel is formed by the housing base and if the flow channel has an inlet and outlet opening on the housing, then it is also possible to still ensure a small size of the operator control unit. This is possible among other things based on the double base of the operator control unit for forming the flow channel in order to thus minimize the influence of the flow channel on the structural depth of the operator control unit. This can be further improved if the flow channel has the inlet opening and the outlet opening at different ends.

The operator control unit according to the invention can therefore contribute to the temperature control of a steering wheel, but can still feature a compact size.

The size of the operator control unit can be further reduced if the fan has an axial impeller.

Preferably, the impeller is provided at the inlet end of the flow channel in order to permit the anatomy of a steering wheel spoke to have an increased diameter in accordance with the impeller than would be possible at the outlet opening of the housing. An increased pressure ratio and thus improved temperature control of the steering wheel can be expected.

If the fan is provided in the flow channel of the housing base, then the housing of the operator control unit can protect and also support the fan. This further reduces the design complexity of the operator control unit, especially since it is possible to dispense with a separate fan housing and the latter can be formed by the housing base.

Alternatively, it is also conceivable for the fan to have a fan housing, which adjoins the housing. It is therefore relatively easy to access the fan for maintenance purposes, which can further facilitate the operation of the operator control unit—particularly if the fan housing of the fan adjoins the housing base.

A simple and secure connection between the housing of the operator control unit and the fan housing can be achieved by means of a detent connection. For this purpose, the housing forms at least one detent hook, which engages in detent fashion in a detent opening in the fan housing and thus firmly connects the fan housing to the housing. Preferably, this connection is detachable in order to facilitate replacement of the fan—for example for maintenance or repair purposes.

The mounting of the fan can be further facilitated if the detent hook extends in the imaginary extension of the flow channel.

The size of the operator control unit can also be further reduced if the housing base has a recess into which the fan is inserted. In addition, the fan therefore does not protrude from the housing, which can further facilitate the mounting of the operator control unit.

The mounting of the operator control unit on a steering wheel can be facilitated in that the housing forms at least one detent element for fastening it to the steering wheel spoke.

If the cross-section of the flow channel tapers from the fan toward the outlet opening, then a resulting pressure increase can further improve the dynamics in the temperature control of the steering wheel.

The operator control unit according to the invention is particularly suitable for a steering wheel with a steering wheel spoke that has an internal spoke channel. A precise temperature control of the steering wheel can be enabled if the flow channel of the operator control unit that is inserted into the steering wheel spoke is fluidically connected to the internal spoke channel of the steering wheel.

A sufficient coupling of the fan to the internal spoke channel can be provided if the outlet opening of the operator control unit adjoins the internal spoke channel of the steering wheel spoke in a fluidically sealed way. In addition, this makes it possible to avoid a short circuiting of the flow at the fan in a simply designed way. An increased efficiency of the temperature control and an improved temperature control can be expected.

BRIEF DESCRIPTION OF THE DRAWINGS

The subject of the invention is shown in greater detail by way of example in the figures based on an exemplary embodiment. In the drawings

IMPLEMENTATION OF THE INVENTION

Figure 1:
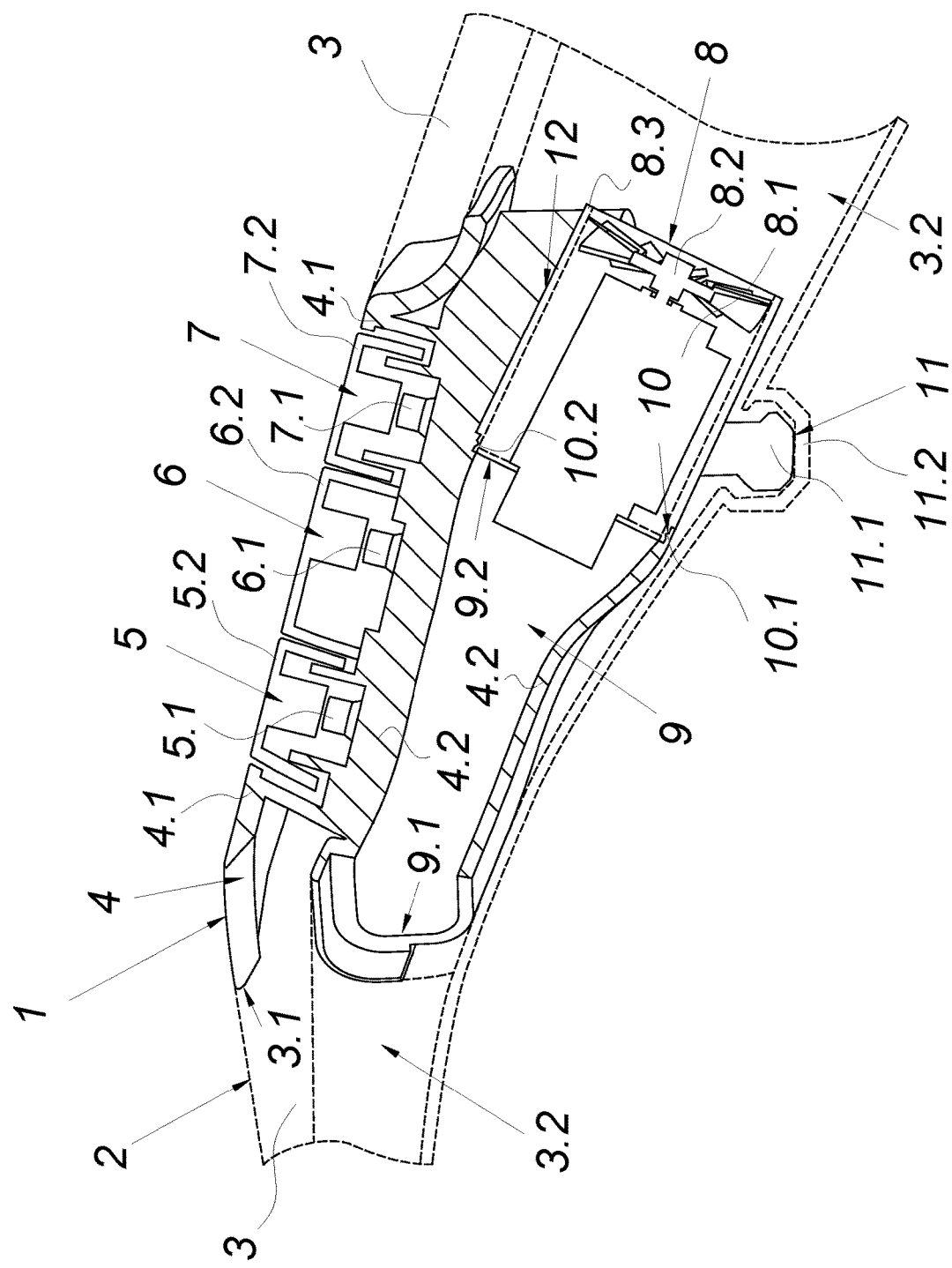
FIG. 1 shows a sectional view of an operator control unit and FIG. 2 shows a top view of the operator control unit according to FIG. 1.

By way of example, FIG. 1 shows a sectional view of an operator control unit 1 for a steering wheel 2 that is depicted with dashed lines in FIG. 1. The operator control unit 1 is detachably fastened in a steering wheel spoke 3 of the steering wheel 2—to this end, the steering wheel spoke 3 has a socket 3.1 into which the housing 4 of the operator control unit 1 is inserted, preferably so it is flush with the steering wheel, as is also visible in a top view shown in FIG. 2.

Figure 2:
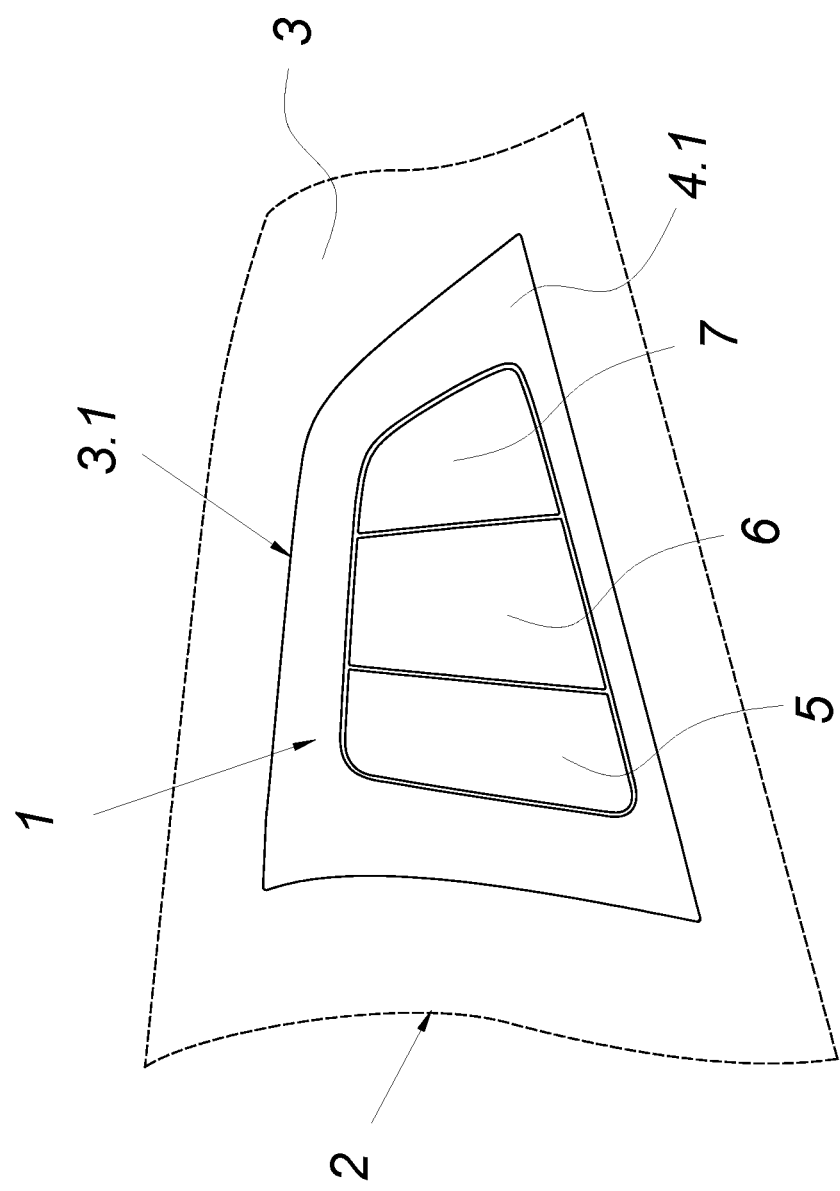

The housing 4 has a closed housing side wall 4.1 and a housing base 4.2; it also has a plurality of electrical switches 5, 6, 7, as is also visible in FIG. 2. These switches 5, 6, 7 are each composed of an electrical contact element 5.1, 6.1, 7.1 provided in the housing 4 and an actuating element 5.2, 6.2, 7.2 which is mounted movably on the housing 4. The actuating element 5.2, 6.2, 7.2 acts with an electrical switching action on the contact element 5.1, 6.1, 7.1. For example, the electrical switches 5, 7 are pushbuttons and the middle switch 6 is a rocker switch.

In addition, the operator control unit 1 includes a fan 8 and a flow channel 9, which is acted upon with the fan 8, with which the steering wheel 2 can be temperature controlled—for example cooled and/or heated. The flow channel 9 is formed by the housing base 4.2, which is embodied as a double base in this region of the flow channel 9. This design ensures a small structural depth of operator control unit 1.

This is also achieved because the housing 4 has the inlet opening 9.2 and the outlet opening 9.1 at different ends of the flow channel 9. This facilitates the attachment of the operator control unit 1 to the internal spoke channel 3.2 of the steering wheel spoke 3. The inlet opening 9.2 and the outlet opening 9.1 are also provided in the housing base 4.2, which further simplifies the design in the region of the flow channel.

The fan 8 has an electric drive unit 8.1, an axial impeller 8.2 that is drive-connected to the drive unit 8.1, and a fan housing 8.3 in order to ensure a compact structural form. The fan housing 8.3 protects the drive unit 8.1 and impeller 8.2.

The fan housing 8.3 adjoins the inlet opening 9.2 and is detachably and firmly connected to the housing 4 of the operator control unit 1 by means of a first detent connection 10. This detent connection 10 is embodied by means of detent hooks 10.1, which engage in detent fashion in detent openings 10.2 in the fan housing 8.3. The fan 8 and housing 4 are thus held together in a durable way. In addition, the detent hooks 10.1 extend in the imaginary extension of the flow channel 9, which enables a simple mounting of the fan 8 on the housing 4 and also avoids torsional forces on the detent connection 10.

Because the fan 8 is provided at the inlet opening 9.2, the impeller 8.2 is provided at the inlet end of the flow channel 9, which reduces design constraints in the region of the fan. Through the increased structural depth of the steering wheel spoke 3 in this region, it is namely possible to provide an impeller 8.2 with a sufficiently large diameter in order to thus produce high volumetric flows. This enables a more precise temperature control of the steering wheel 2.

The housing base 4.2 has a recess 12, which adjoins the inlet opening 9.2 of the flow channel 9. The fan 8 is provided in this recess 12 and is embodied in such a way that the fan 8 provided in it does not protrude laterally from the housing 4. This facilitates the insertion of the operator control unit 1 into the socket 3.1 in the steering wheel spoke 3. For example, the recess can be embodied in a simply designed way in that after the inlet opening 9.2, the upper housing base wall of the housing base 4.2 juts out beyond the lower housing base wall of the housing base 4.2.

Alternatively, it is also conceivable for the fan 8 to be provided in the flow channel 9 of the housing base 4.2, which is depicted with dashed lines in FIG. 1. As a result, the fan 8 does not require a fan housing 8.3—the housing base 4.2 can therefore serve as a support for the remaining components of the fan 8.

The operator control unit 1 is detachably and firmly connected to the steering wheel spoke 3 by means of a second detent connection 11. To this end, the housing 4 forms a detent element 11.1, for example one that is inclined relative to the housing base 4.2, which engages in detent fashion in a complementarily embodied detent opening 11.2 provided in the steering wheel spoke 3.

In addition, the outlet opening 9.1 adjoins the internal spoke channel 3.2 in a fluidically sealed way, which prevents a short circuit in the air flow for the temperature control of the steering wheel 2.

The invention claimed is:

1. An operator control unit for a steering wheel, the operator control unit comprising:
   a housing which is insertable into a steering wheel spoke of the steering wheel and which has at least one housing side wall and a housing base;
   an electrical contact element provided in the housing;
   at least one actuating element which is mounted movably in the housing wall above the housing base and which acts with an electrical switching action on the contact element;
   a fan for a steering wheel temperature control arrangement; and
   a flow channel which is acted on by the fan, wherein the flow channel is formed by the housing base and has an inlet opening and an outlet opening in the housing base, wherein the fan has a fan housing, which adjoins the housing.

2. The operator control unit according to claim 1, wherein the fan has an axial impeller.

3. The operator control unit according to claim 2, wherein the impeller is provided at an inlet end of the flow channel.

4. The operator control unit according to claim 1, wherein the fan is provided in the flow channel of the housing base.

5. The operator control unit according to claim 1, wherein the fan housing of the fan adjoins the housing base.

6. The operator control unit according to claim 5, wherein the housing base has a recess into which the fan is inserted.

7. The operator control unit according to claim 1, wherein the housing forms at least one detent hook, which engages in detent fashion in a detent opening in the fan housing and thus connects the fan housing to the housing.

8. The operator control unit according to claim 7, wherein the detent hook, which engages in detent fashion in the detent opening in the fan housing, thus connects the fan housing to the housing in a detachable way.

9. The operator control unit according to claim 7, wherein the detent hook extends in an imaginary extension of the flow channel.

10. The operator control unit according to claim 1, wherein the housing forms at least one detent element for fastening the housing to the steering wheel spoke.

11. The operator control unit according to claim 1, wherein a cross-section of the flow channel tapers from the fan toward the outlet opening.

12. A steering wheel having a steering wheel spoke that has an internal spoke channel and having an operator control unit according to claim 1 that is inserted into the steering wheel spoke, wherein the flow channel of the operator control unit is fluidically connected to the internal spoke channel.

13. The steering wheel according to claim 12, wherein the outlet opening of the operator control unit adjoins the internal spoke channel of the steering wheel spoke in a fluidically sealed way.

* * * * *